Sept. 25, 1962     I. T. WURN     3,055,523

EXTENSION HAND TRUCK

Filed Aug. 10, 1955     4 Sheets-Sheet 1

Inventor
Isadore T. Wurn.
By Harold O. Van Antwerp
Attorney

Sept. 25, 1962 I. T. WURN 3,055,523
EXTENSION HAND TRUCK
Filed Aug. 10, 1955 4 Sheets-Sheet 2

Inventor
Isadore T. Wurn
By Harold C. Van Antwerp
Attorney

Sept. 25, 1962 I. T. WURN 3,055,523
EXTENSION HAND TRUCK
Filed Aug. 10, 1955 4 Sheets-Sheet 3

Inventor
Isadore T. Wurn
By Harold O. von Oatwert
Attorney

Sept. 25, 1962

I. T. WURN 3,055,523

EXTENSION HAND TRUCK

Filed Aug. 10, 1955

4 Sheets-Sheet 4

Inventor
Isadore T. Wurn
By Harold C. VanAntwerp
Attorney.

United States Patent Office 3,055,523
Patented Sept. 25, 1962

3,055,523
EXTENSION HAND TRUCK
Isadore T. Wurn, 434 Ruddiman Ave.,
N. Muskegon, Mich.
Filed Aug. 10, 1955, Ser. No. 527,617
8 Claims. (Cl. 214—515)

This invention relates to an extension hand truck of the type having wheels at its lower end and handles at its upper end with a forwardly projecting foot at its lower end used to move heavy objects from one place to another. But the present truck differs from the ordinary hand truck of this type in that it has a frame composed of a plurality of sections which are extensible relative to each other with a carriage slidably movable thereon so that the object on the truck may be hoisted to an elevated location, such as up a flight of stairs, the truck frame being extended up said stairs with the upper section located above an upper floor and the lower wheels resting on the lower floor and a windlass on the upper section connected with the carriage so that the carriage with its load can be hoisted to the upper level whereat the upper section having the handles and also wheels at its lower end, may be disconnected from the lower part of the frame and with carriage with its load wheeled to the desired location on said upper level.

If the stairs are longer than the extended length of the truck, it may be extended part way up the stairs and the carriage with its load hoisted said part way and then the lower sections moved upwardly with the lower wheels resting on the stairs and the frame again extended to the upper level after which the load is again elevated as before.

Figure 2:
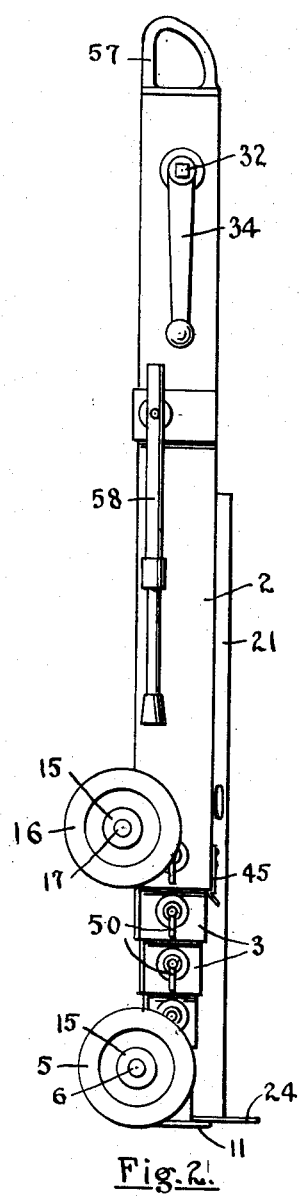
Figure 1:
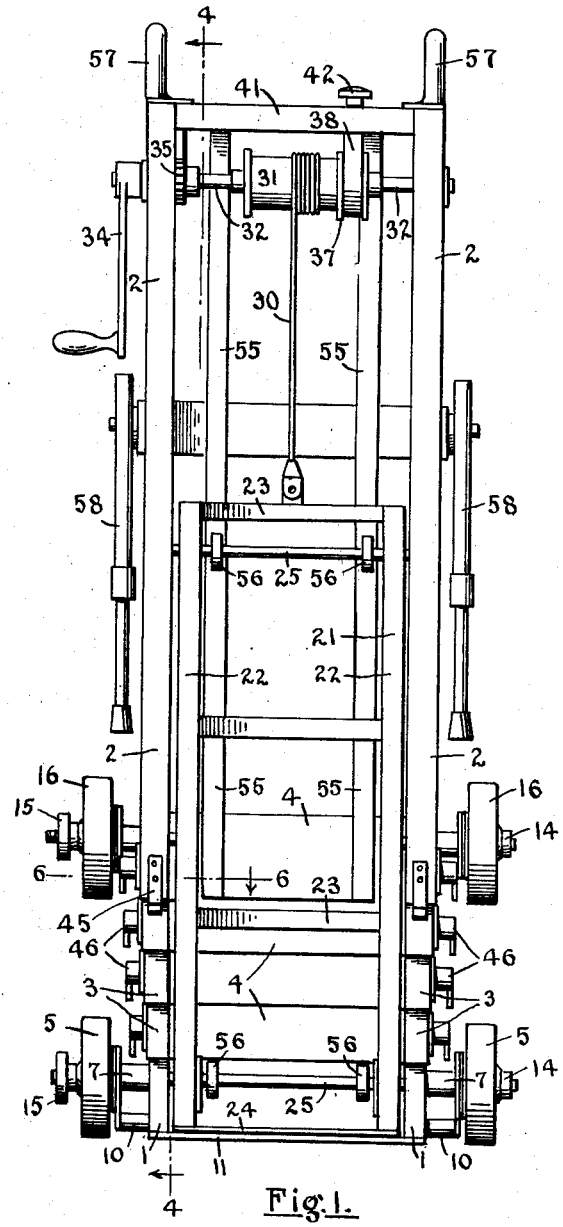
Figure 4:
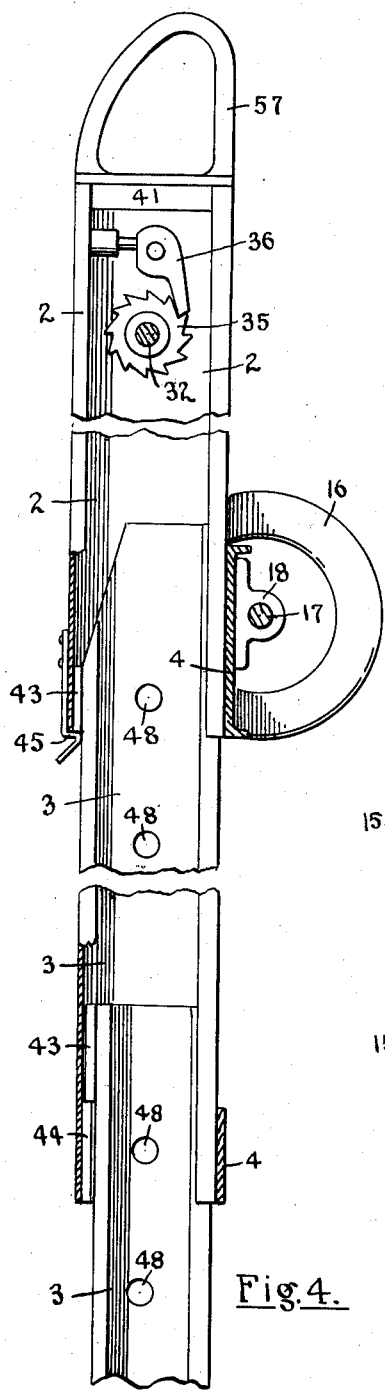
Figure 3:
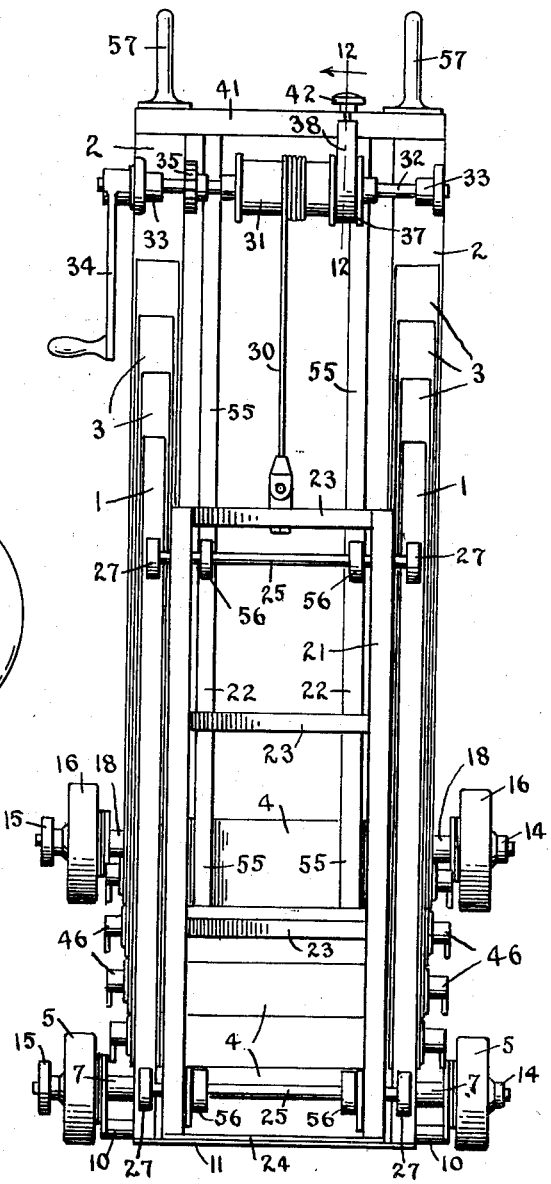
Figure 5:
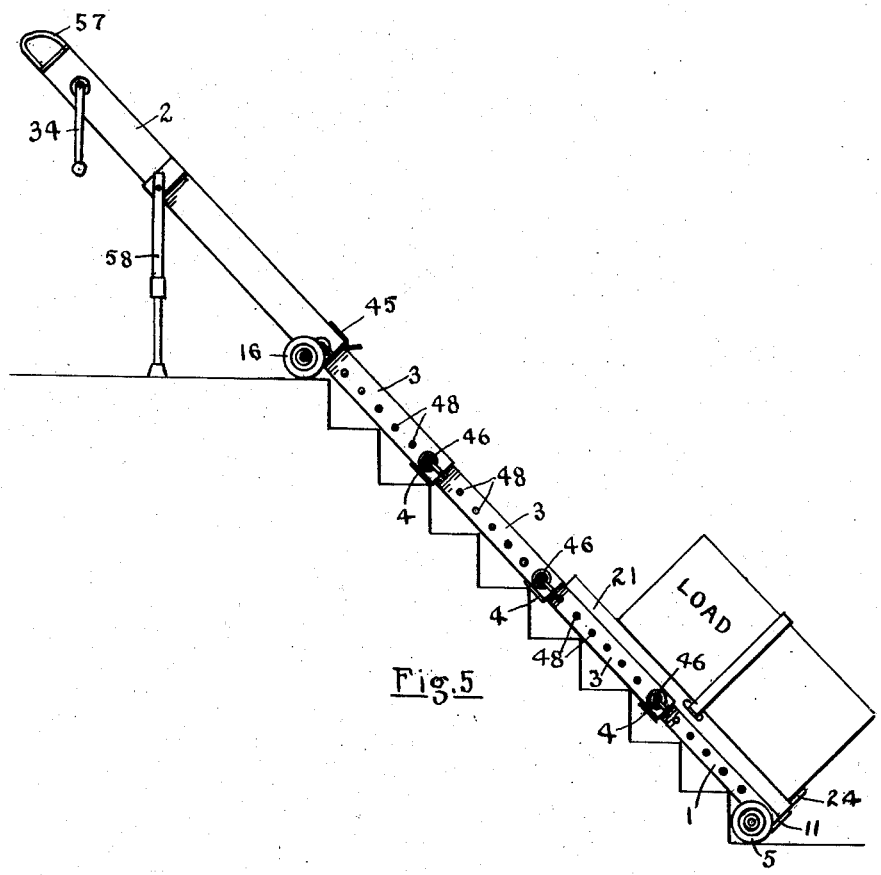
Figure 6:
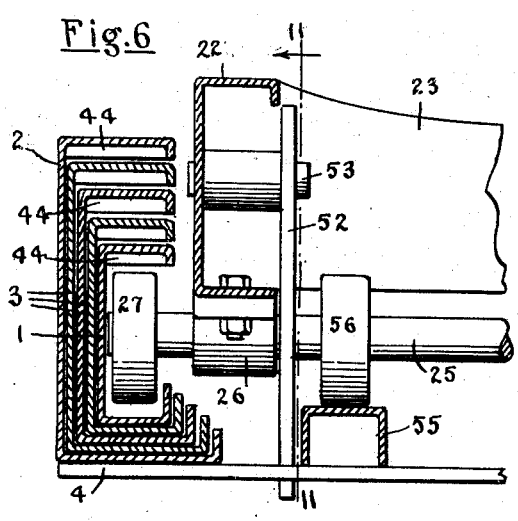
Figure 8:
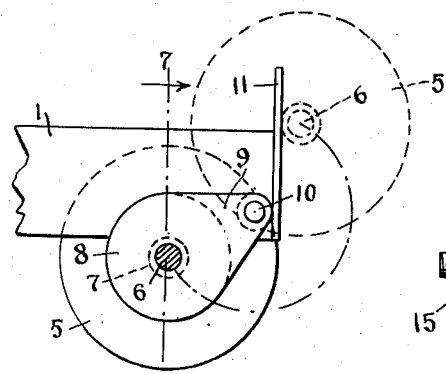
Figure 7:
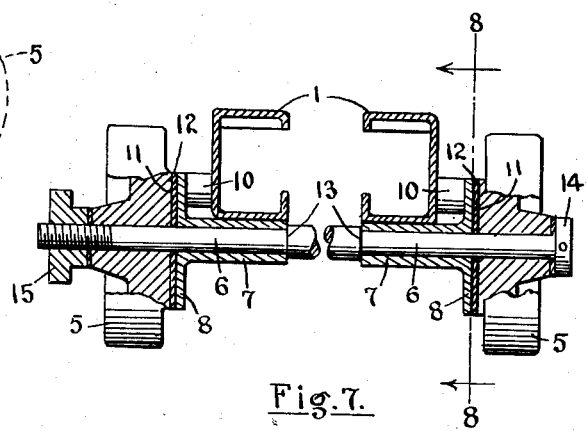
Figure 9:
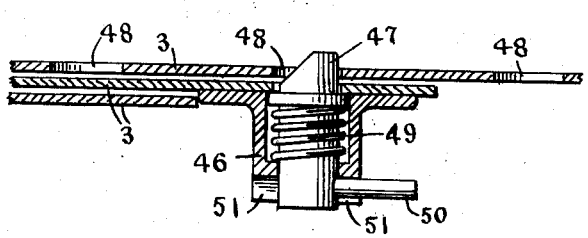
Figure 10:
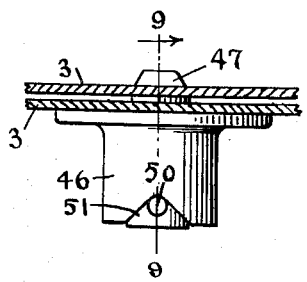
Figure 11:
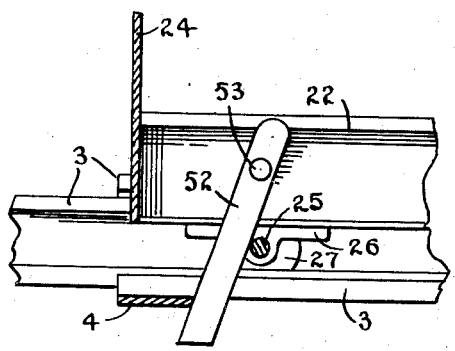
Figure 12:
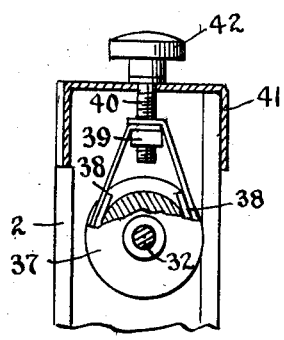

The invention provides various novel features of construction and arrangement hereafter more fully described, reference being had to the accompanying drawings in which, FIG. 1 is a front elevation of the truck in its retracted position, FIG. 2 is a side elevation of the same, FIG. 3 is a front elevation similar to FIG. 1 with the forward parts of the frame side members broken away, FIG. 4 is an enlarged vertical section on the line 4—4 of FIG. 1 with parts broken away, FIG. 5 is a reduced size elevation of the truck extended up a flight of stairs, FIG. 6 is an enlarged transverse fragmentary section on the line 6—6 of FIG. 1, FIG. 7 is a section, with parts broken away, on the axis of the lower wheels and on the line 7—7 of FIG. 8, FIG. 8 is a fragmentary section on the line 8—8 of FIG. 7 showing the pivotal mounting of the lower wheel bearings, FIG. 9 is a fragmentary section on the line 9—9 of FIG. 10 showing the latch which retains the sections in their adjusted positions, FIG. 10 is an exterior view of the latch of FIG. 9, FIG. 11 is a fragmentary section on the line 11—11 of FIG. 6 showing the safety catch, and FIG. 12 is a fragmentary section on the line 12—12 of FIG. 3 showing the brake for the windlass shaft.

Like reference numerals apply to like parts in all of the figures.

The truck comprises a lower section having side frame members 1, an upper section having side frame members 2 and intermediate sections having side frame members 3. These side frame members 1, 2, and 3 at each side of the truck are inwardly opening channels telescopingly mounted together for longitudinal extension or retraction. The lower ends of each pair of the side frame members of each respective section are connected by cross bars 4 projecting from the rear sides of the channels.

The lower section having the side members 1 is provided with a pair of wheels 5 rotatable on a shaft 6 mounted in bearings 7 which are pivotally connected to the frame members 1 at their lower ends. Each of the bearings 7 has a break disk 8 which have extensions 9 pivotally connected to the outer sides of the frame members 1 at 10. A foot 11 is attached to the lower ends of the frame members 1 and projects forwardly therefrom. By this construction, the wheels 5 may be swung to two positions in one of which the wheels 5 project rearwardly of the section with the bearings 7 resting against the rear side of the frame members 1 and in the other position the wheels project downwardly from the section with the bearings 7 resting against the lower side of the foot 11.

A brake is built into this wheel structure comprising the disks 8 fixed to the bearings 7, a break surface 12 on the inner ends of the hubs of the wheels 5 and friction disk interposed between the disks 8 and the brake surface 11. The shaft 6 is shouldered at 13 adjacent the inner ends of the bearings 7 and has a fixed collar 14 at one end and the shaft is threaded at its other end where it is provided with a hand nut 15. By tightening the nut 15 against the outer side of the hub of its adjacent wheel 5 a longitudinal stress is put upon the shaft 6 pressing the friction disks 12 tightly between the brake surfaces 11 on the wheel hubs and the disks 8 which are connected to the bearings 7 thus resisting rotation of the wheels.

The lower end of the upper section having the side rails 2 has a pair of wheels 16 similar in construction to the wheels 5 excepting that its shaft 17 is mounted in bearings 18 fixed to the cross bar 4 (FIG. 4) and is not pivotal. The braking structure is similar to that of the wheels 5.

A load bearing carriage 21 is traversably mounted on the side members of the respective sections. The carriage has side frame member 22 located between the side members 1, 2, and 3 of the sections. Cross members 23 connect the frame members 21 and a forwardly projecting foot 24 is located at the bottom of the carriage.

Shafts 25 located near the upper and lower ends of the carriage are mounted in bearings 26 attached to the rear sides of the frame members 22 and project outwardly therefrom where they have rollers 27 located to run in the channels 1, 2, and 3 of the respective truck sections whether the said sections are extended or retracted.

A cable 30 is attached to the upper end of the carriage 21 and extends upwardly where it is wound around the drum 31 of a windlass. The drum 31 is fixed to a shaft 32 journaled in bearings 33 fixed to the respective side members 2 of the upper truck section. A crank 34 is fixed to one end of the shaft 32 and a ratchet and pawl structure 35 and 36 connected respectively to said shaft and the section member 2 prevents rotation of the drum 31 in an unwinding direction excepting when the pawl is released.

A hand operated brake to resist rotation of the drum comprises a brake drum 37 fixed to the shaft 32 and a brake band 38 partially surrounds the brake drum 37. The respective ends of the band 38 are attached to a nut 39 threaded onto a shaft 40. The shaft 40 is journaled in the upper cross member 41 of the upper truck section and is provided with a hand knob 42 by which the shaft 40 may be rotated to tighten pressure of the brake band 38 on the brake drum 37 for the purpose of governing the lowering of the load on the carriage 21.

The cross bars 4 projecting rearwardly from the lower end of each respective truck section abut against each other when the sections are fully retracted and limit such retracting movement of the sections. To prevent the sections from being extended too far so that they would separate, stop blocks 43 are fixed to outer sides of the upper ends of each of channel members 1, 2, and 3 and coacting stop blocks 44 are fixed to inner sides at the bottoms of each of the channel members 1 and 3. When the truck sections are fully extended, the respective stop blocks 43 and 44 engage each other (FIG. 4) and prevent the sections from being pulled apart.

Instead of inwardly projecting stop blocks 44, the channel members 2 of the upper section have releasable catches 45 at their lower ends which engage the outer stop blocks 43 on the channels 3 of the next lower intermediate section and normally prevent separation. These catches 45 may be released from the stop blocks 43 to permit separation of the upper section as hereafter explained.

To hold the side channels 1, 2, and 3 in their adjusted positions relative to each other, latches are provided each comprising a casing 46 mounted near the lower end of each channel. A beveled end latch bolt 47 is slidable mounted in the casing with its beveled and projecting through the channel wall and adapted to enter any of a series of holes 48 longitudinally spaced along the next adjacent channel wall. A spring 49 urges the bolt 47 inward. An arm 50 projects radially from the outer end of the bolt and will enter either of two notches 51 located diametrically opposite each other in the outer end of the casing 46. When the arm 50 is in one of the notches 51 the bevel of the bolt 47 faces upwardly and when the sections are extended the bolt will ratchet over the holes 48 in the next section and come to rest in one of the holes 48 whereat the desired extended position is reached and will prevent retraction of the sections. When the latch bolt is reversed with the arm 50 located in the opposite notch 51 the beveled surface will face downwardly and permit the sections to be retracted and will come to rest in one of the holes 48 holding the sections against extension.

A safety catch 52 is provided to prevent inadvertent dropping of the carriage 21 and its load should the windlass be accidentally released. This catch 52 is in the nature of a bar pivoted at 53 to a side member 22 of the carriage above the lower shaft 25. When in operative position, the catch 52 extends rearwardly below and in contact with the shaft 25, its inner end being in the path of the cross bars 4 of the respective sections and it will engage one of the bars 4 and stop further downward movement of the carriage. To permit normal downward movement of the carriage, the catch bar 52 is swung around so that it rests above the shaft 25 and will ratchet past the cross bars 4.

As above described, the carriage 21 is normally supported on the rollers 27 which traverse the channels 1 and 3. However, the upper section having the side channel rails 2 is provided with auxiliary tracks 55 located inwardly from the channels 2 and auxiliary rollers 56 are mounted on the shafts 25 in alignment with the tracks 55. The auxiliary tracks 55 extend downwardly far enough so that all four of the auxiliary rollers 56 will be upon them when the carriage is moved onto the upper section. These tracks 55 have their surfaces above the roller bearing surfaces of channels 1, 2, and 3 and when the carriage 21 is located on the upper section it is carried by the auxiliary rollers 56 on the auxiliary tracks 55 with the rollers 27 lifted from the channels 1 and 3 (FIG. 6). This structure is for the purpose of relieving the load from the lower section and the intermediate sections so that they may be extended or retracted without undue friction between them.

*Operation*

Assuming the load to be located on a lower floor and it is desired to move it higher as up a flight of stairs. All of the sections of the truck are fully retracted and the wheels 5 on the lower section are pivoted so that the bearings 7 rest against the channels 1 (FIGS 1 and 2). In this position the latch bolts 47 are turned with their bevels facing downward and prevent extension of the sections. The truck is then trundled over the floor, using hands 57 on the upper section, as an ordinary truck, the load is located on the carriage 21 and secured thereto by suitable means.

The truck is then moved with its load to the foot of the stairs where the wheels 5 are located against or near the lower stair riser and if desired are locked by settting the brakes actuated by the hand nut 15.

The truck is then tipped rearwardly in alignment with the stairs, the latch bolts 47 reversed and the sections are extended by pulling upwardly on the handles 57 until the upper section is entirely above the upper floor with its wheels 16 resting thereon (FIG. 5). These wheels may then be locked by setting their brakes. Pivoted legs 58 may be mounted on the side rails 2 of the upper section and may be turned to rest upon the upper floor, their lengths being adjustable by suitable means not shown in detail.

The truck is now ready to hoist the load which is done by rotating the drum 31 by means of the shaft 32 and the hand crank 34. Rotation of the drum 31 winds the cable 30 thereon and pulls the carriage 21 upwardly until it is entirely located upon auxiliary tracks 55 and there it is held by means of the ratchet and pawl 35, 36 which prevent reverse rotation of the drum 31.

Now by releasing the catches 45 from the stop blocks 43 on the next lower section, the upper section may be pulled off and disconnected from said next lower section and after releasing the brakes on its wheels 16 it may be manipulated by the handles 57 to roll the load to the desired location on said upper floor.

After the load has been removed from the carriage 21, the upper section can be returned and reconnected to the upper section, the catch 45 snapping back over the stop block 43 and after reversing the latch bolts 47 so that their beveled surfaces face downwardly the sections may be retracted back down the stairs until fully retracted and the operation repeated to move and elevate a new load up the stairs.

This retracting movement may be done with the carriage 21 held in place on the tracks 55 of the upper section which holds the rollers 27 off the lower channels and reduces the frictional resistance between the channels. Or if preferred, the carriage may first be lowered to the bottom section by releasing the pawl 36 from the ratchet 35 and permitting the drum 31 to rotate to unwind the cable 30 therefrom.

If the stairs are longer than the fully extended length of the truck, the hoisting operation may be made in two or more steps. To do this the sections are extended as far as possible with the wheels at rest on one of the steps where they are locked by tightening their brakes. Then the carriage is elevated as before by winding the cable 30 on the drum 31 until the carriage is located on the auxiliary tracks 55 with the rollers 27 lifted from the channels 1 and 3. The shaft 13 of the wheels 5 is then pivoted so that the wheels are above the stairs or may ride freely over them. Then the lower sections are moved upwardly to retracted position and the wheels 5 rotated back to rest on one of the intermediate steps where they are locked by tightening their brakes. The upper sections are now extended leaving the carriage at rest against the foot 11 on the lower section. The upper section is raised above the stairs and rested on the upper floor, the wheels 16 locked and the load elevated to the top section which is then unlatched and wheeled away as before.

If it is desired to lower the load from the upper floor to the lower floor, the operation is reversed. That is the load is placed on the carriage on the upper section on the upper floor. The section is then wheeled to the extended lower sections where it is attached as above described. The carriage with its load is then lowered by releasing the pawl 36 from the ratchet 35 and permitting the drum to rotate, under control of the brake 38, to unwind the cable 30 therefrom.

The invention is defined by the appended claims which are to be considered comprehensive of all forms coming within their scope.

I claim:

1. An extension hand truck comprising an upper section, a lower section and an intermediate section, all of said sections being slidably connected together for extension and retraction longitudinally of the truck, a pair of wheels mounted on said upper section near the lower end thereof, a pair of wheels mounted on said lower section near the lower end thereof, a load carrying carriage traversably mounted on said sections, means associated with said upper section for hoisting said carriage from the lower section to the upper section, means for holding said load on said upper section, and means for quickly manually disconnecting said upper section from the next lower section for removal therefrom, whereby said upper section can be used as a separate hand truck independently of said other sections.

2. The elements of claim 1 combined with means for normally preventing separation of said sections, said means for preventing separation of said upper section from the next lower section being quickly manually disconnectable whereby the upper section may be removed from the remainder of the structure.

3. An extension truck comprising an upper section, a lower section and an intermediate section, said sections being slidably connected together for extension and retraction longitudinally of the truck, a pair of wheels near the lower end of the upper section, a pair of wheels near the lower end of the lower section, a load carrying carriage, means for supporting said carriage to traverse said lower and intermediate sections, means to traversably support said carriage on said upper section, said last named supporting means acting to release the carriage supporting means from the lower and intermediate sections.

4. The elements of claim 3 combined with means normally acting to prevent separation of said sections in the direction of extension, said last named means coacting between the upper section and the next lower section being quickly manually releasable to permit removal of the upper section from the remainder of the structure.

5. An extension truck comprising, an upper section, a lower section and an intermediate section, each of said sections having channel shaped side members telescopingly mounted together, a load carrying carriage, rollers on said carriage mounted to traverse said channel members, auxiliary tracks on said upper section, auxiliary rollers on said carriage mounted to traverse said auxiliary tracks, said auxiliary rollers and tracks being proportioned, when in engagement, to release the first named rollers from said channel members.

6. The elements of claim 5 combined with wheels near the lower end of said lower section, wheels near the lower end of the upper section and detachable means to permit separation of said upper section from the remainder of the structure.

7. The elements of claim 4 combined with means for hoisting said carriage from the lower section onto the upper section.

8. A hand truck comprising a plurality of telescoping sections, one of said sections being readily separable from and attachable to the others, said one section and one of said other sections being equipped with first and second wheels respectively, and said one section also being equipped with handle means; and means for moving a load between said one section and said one of said other sections, said handle means cooperating with said first wheels for transportation of said load when said one section is separated, and with said second wheels when said one section is attached.

References Cited in the file of this patent

UNITED STATES PATENTS

| | | |
|---|---|---|
| 127,897 | Kruse | June 11, 1872 |
| 1,311,165 | Hennessy | July 29, 1919 |
| 1,591,719 | Merrifield | July 6, 1926 |
| 1,887,548 | Dartsup | Nov. 15, 1932 |
| 1,967,592 | Rawlings | July 24, 1934 |
| 2,297,572 | Martin | Sept. 29, 1942 |
| 2,497,440 | Denny | Feb. 14, 1950 |
| 2,542,398 | Crumpton | Feb. 20, 1951 |
| 2,711,260 | Butler | June 21, 1955 |
| 2,721,085 | Powell | Oct. 18, 1955 |

FOREIGN PATENTS

| | | |
|---|---|---|
| 543,880 | France | Nov. 24, 1921 |